Aug. 31, 1937.  C. HALL, JR  2,091,507
ATTACHMENT FOR REMOTE CONTROL VALVES
Filed March 4, 1936
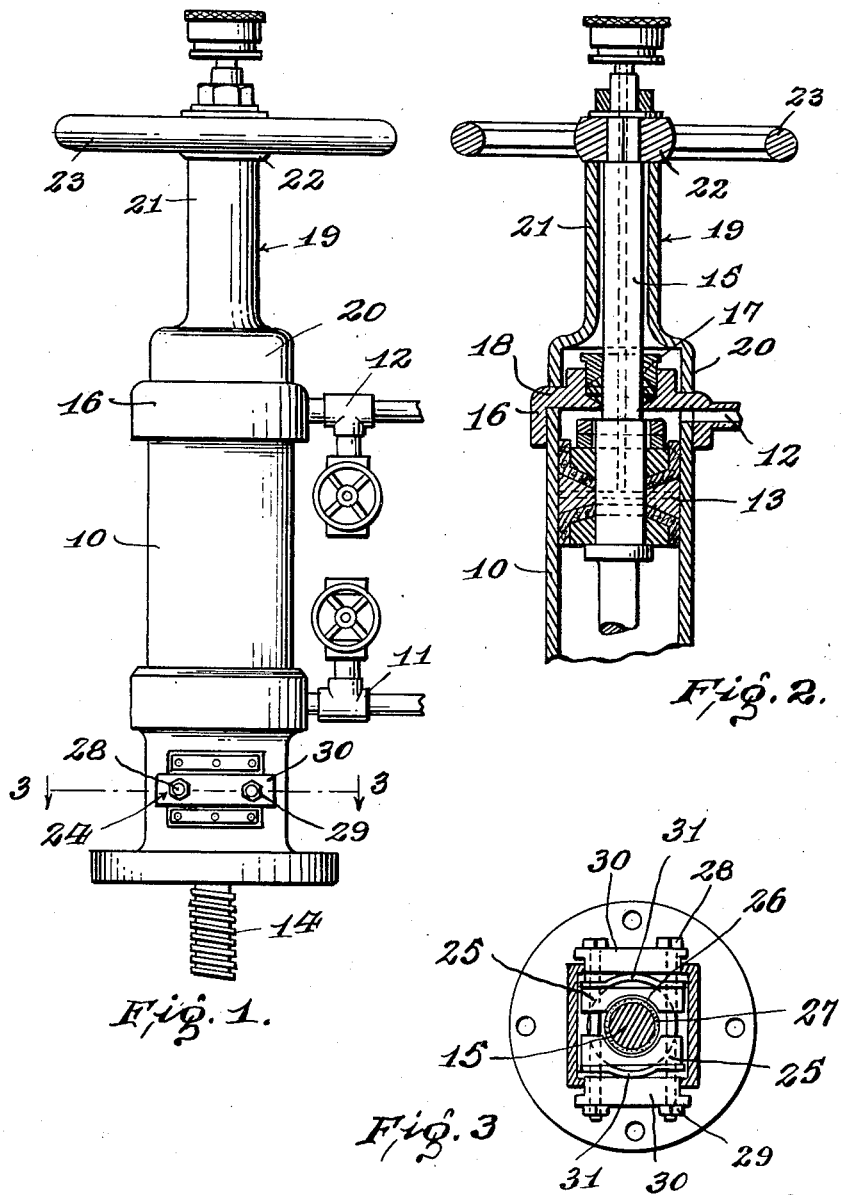
Inventor
Carlos Hall, Jr.,
By Christian R. Nielsen.
Attorney Patented Aug. 31, 1937

2,091,507

UNITED STATES PATENT OFFICE 2,091,507

ATTACHMENT FOR REMOTE CONTROL VALVES

Carlos Hall, Jr., Mexico, D. F., Mexico, assignor of one-half to Harry Hadfield Hallatt, Mexico, D. F., Mexico Application March 4, 1936, Serial No. 67,157
In Mexico March 29, 1935

3 Claims. (Cl. 137—139)

My invention relates to means for converting hand operated valves into valves of remote control operated through the medium of a fluid pressure (air, gas, steam, water, etc.), and it consists in the constructions, arrangements and combinations herein described and claimed.

It is one of the objects of the invention to provide means for maintaining the stem of the valve against descent such as is required in the operation of valves embodying a non-rising stem.

It is a still further object of the invention to provide a frictional brake means for maintaining the valve at a determined position, in the event of accident to the pressure lines associated with the valve and controlling the actuation thereof.

Additional objects, advantages and features of invention will be apparent from the following description considered in conjunction with the accompanying drawing, wherein Figure 1 is a side elevation of my invention.

Figure 2 is a fragmentary sectional view of the upper portion thereof.

Figure 3 is a cross sectional view on the line 3—3 of Figure 1.

There is illustrated a cylinder 10 having fluid inlet means 11 and 12 at the bottom and top thereof, through which fluid under pressure may be admitted to the cylinder for imparting reciprocating movements to the piston 13 whereby to effect opening or closing movements of a gate valve (not shown) associated with the threaded portion 14 of the stem 15.

The cylinder 10 includes a closure head 16 through which the stem 15 passes, being suitably packed as at 17, and the upper face of the head 16 has a planiform shoulder 18 upon which the lower end of a sleeve 19 is seated. The sleeve 19 comprises an enlarged base portion 20 of a size to circumscribe the packing 17 terminating in a reduced elongated tube portion 21. The upper portion of the tube engages the under side of the hub 22 of a hand wheel 23, the latter being fixed to the stem 15 whereby rotation of the stem may be effected to impart movement of a gate valve associated with the threaded portion 14.

From the foregoing it will be seen that the stem 15 may be rotated by virtue of the hand wheel 23, yet the sleeve 19 prevents longitudinal movements of the stem, due to its engagement between the hub 22 and the shoulder 18.

Occasion may arise where the fluid pressure lines of a power actuating system become defective, preventing proper actuation of the piston 13, and in order to hold the gate valve in the position at which it was set at the time of disruption of the pressure lines, I provide a friction brake, generally indicated at 24.

The brake 24 comprises a pair of dies 25 having semi-circular recesses 26 of a size to partly circumscribe a packing 27 carried by the stem. The dies 25 are arranged upon opposite sides of the stem 15 and are suitably apertured, the apertures being aligned and receiving therethrough bolts 28, each of which includes a nut 29. Follower blocks 30 are slidably engaged upon the bolts 28, there being one adjacent each die 25, but between each die 25 and block 30 there is provided a flat tension spring 31.

Obviously from the foregoing it will be seen that upon tightening of the nuts 29 compression of the springs 31 will be effected causing an increased gripping action of the dies 25 upon the packing 27, and that loosening of the nuts 29 will have an opposite effect. Therefore with variance of the tension of the springs, the movement of the stem 15 may be controlled, and further uniform upward and downward movement of the piston is obtained in its normal work of actuating the gate of the valve.

While I have shown and described a preferred construction, this is by way of illustration only, as I am aware that structural changes may be made, and I therefore consider as my own, all such modifications as fairly fall within the scope of the appended claims.

I claim:—

1. Means for preventing descension of the stem of a valve by gravity comprising a stem having a frictional packing thereon, a pair of die members partly circumscribing the packing, and means for adjusting the die members upon the packing.

2. Means for preventing descension of the stem of a valve by gravity comprising a stem having a packing thereon, a pair of die members partly circumscribing the packing and arranged in opposed relation, a follower block outwardly of each die member, spring means interposed between each die member and follower block, and said die members and follower blocks having aligned apertures for reception of tie bolts for varying the tension of said springs.

3. Means for converting a fluid actuated valve operating means of the rising type to a hand operated means of the non-rising type, comprising in combination, a cylinder, a normally reciprocating valve stem therein having an end projected beyond the cylinder, manual means on the projecting end of the stem for rotating the stem, and means interposed between the cylinder and the manual means for preventing longitudinal movement of the valve stem.

CARLOS HALL, JR.